United States Patent [19]

McNulty et al.

[11] Patent Number: 5,025,670

[45] Date of Patent: Jun. 25, 1991

[54] MEANS FOR INTRODUCING INSPECTION EQUIPMENT IN ACTIVE PIPELINES

[76] Inventors: George R. McNulty, 4709 Lake Rd., Sheffield Lake, Ohio 44054; Charles E. Luff, 3909 Easton Rd., Norton, Ohio 44203

[21] Appl. No.: 530,224

[22] Filed: May 30, 1990

[51] Int. Cl.$^5$ ............................................. G01B 5/12
[52] U.S. Cl. ................................................. 73/865.8
[58] Field of Search ................. 73/866.5, 865.8, 865.9, 73/40.5 R; 137/317–320; 324/220; 33/544.1–544.4

[56] References Cited

U.S. PATENT DOCUMENTS

| | | | |
|---|---|---|---|
| 997,464 | 7/1911 | Metcalf | 137/318 |
| 3,703,909 | 11/1972 | Erb | 137/318 |
| 4,067,353 | 1/1978 | DeHoff | 137/318 |
| 4,460,920 | 7/1984 | Weber et al. | 73/623 |
| 4,546,789 | 10/1985 | Taylor | 137/317 |
| 4,649,948 | 3/1987 | Hudson | 137/318 |

Primary Examiner—Robert Raevis
Attorney, Agent, or Firm—Pearne, Gordon, McCoy & Granger

[57] ABSTRACT

A method and apparatus for internally inspecting a relatively small diameter live pipeline with a camera introduced into an elongated hole cut into the wall of the pipeline at a strategic location. A housing formed by a pair of opposed oblique nipples is secured to the pipe and a rotary cutter is operated successively through the nipples to produce the elongated hole. The camera is introduced successively through each of the nipples to scan both upstream and downstream of the location of the elongated hole. The oblique orientation of the nipples simplifies the elongated hole forming operation and reduces flexural stresses on a cable used to propel the camera through the pipeline.

6 Claims, 3 Drawing Sheets

MEANS FOR INTRODUCING INSPECTION EQUIPMENT IN ACTIVE PIPELINES

BACKGROUND OF THE INVENTION

The invention relates to methods and apparatus for inspecting in-service pipelines.

PRIOR ART

In-service pipelines are subject to corrosion and other forms of damage or degradation. When a pipeline is buried in the earth or otherwise not readily accessible for external visual inspection it is known to survey the condition of the pipeline by causing a television camera to travel through the line while pipeline remains in place and, if conditions permit, while it remains in service. Generally, this television scanning technique has only been most practical where the pipeline to be inspected is relatively large in diameter so as to permit passage of a self-propelled camera mounted on traction wheels. It has not been generally practical to inspect small diameter pipelines internally with a TV camera because of the difficulty in introducing the camera laterally through the wall of small diameter pipelines and because the limited area of a small pipe does not accommodate the bulk of known traction propelled TV cameras.

SUMMARY OF THE INVENTION

The invention provides a method and apparatus for internally inspecting a pipeline while it remains in service and is especially suited for inspecting buried, small diameter pipe. In accordance with the invention, an access hole is cut into the wall of the pipe at a strategic location. The hole is cut by a tool operating within a fluidtight housing assembled on and sealed with the exterior of the pipeline. The housing includes guide surfaces that support the cutter tool for advance into the wall of the pipe along two separate axii, each oblique to the axis of the pipe and having a directional component along the pipe opposed to that of the other.

The cutting tool preferably is a hole saw that rotates and advances successively on each of the separate cutting axii. The hole saw and cutting axii are arranged in the housing to cut an oblong hole in the wall of the pipeline that is considerably longer in the axial direction of the pipe than it is in the transverse direction. The oblong configuration of the hole allows a relatively large elongate TV inspection camera to be inserted into and traverse the pipeline.

In the preferred embodiment of the apparatus, the housing comprises two nipple-like branches that are angled in a common plane radial of the pipe and converge towards the wall area to be entered. Gate valves or like means are provided on each branch nipple to permit entry and withdrawal of the cutting element or elements and, subsequently, inspection apparatus.

The branches of the housing are angled in opposed directions with respect to the axis of the pipe and, consequently, are adapted to support and guide a relatively stiff inspection cable through the opening cut in the pipeline successively in opposite directions along the pipe. This capability of the housing for bi-directionally supporting the inspection cable is of great importance because it permits inspection of an extended length of buried pipe through points of entry spaced at distances twice that of the working length of the cable. The working length of the cable can be limited by friction between it and the interior walls of the pipe and the practical length of communications wire associated with the inspection camera. Excavation and site preparation time for entry into the pipeline is proportionately reduced.

DESCRIPTION OF THE PREFERRED EMBODIMENT

Figure 1:
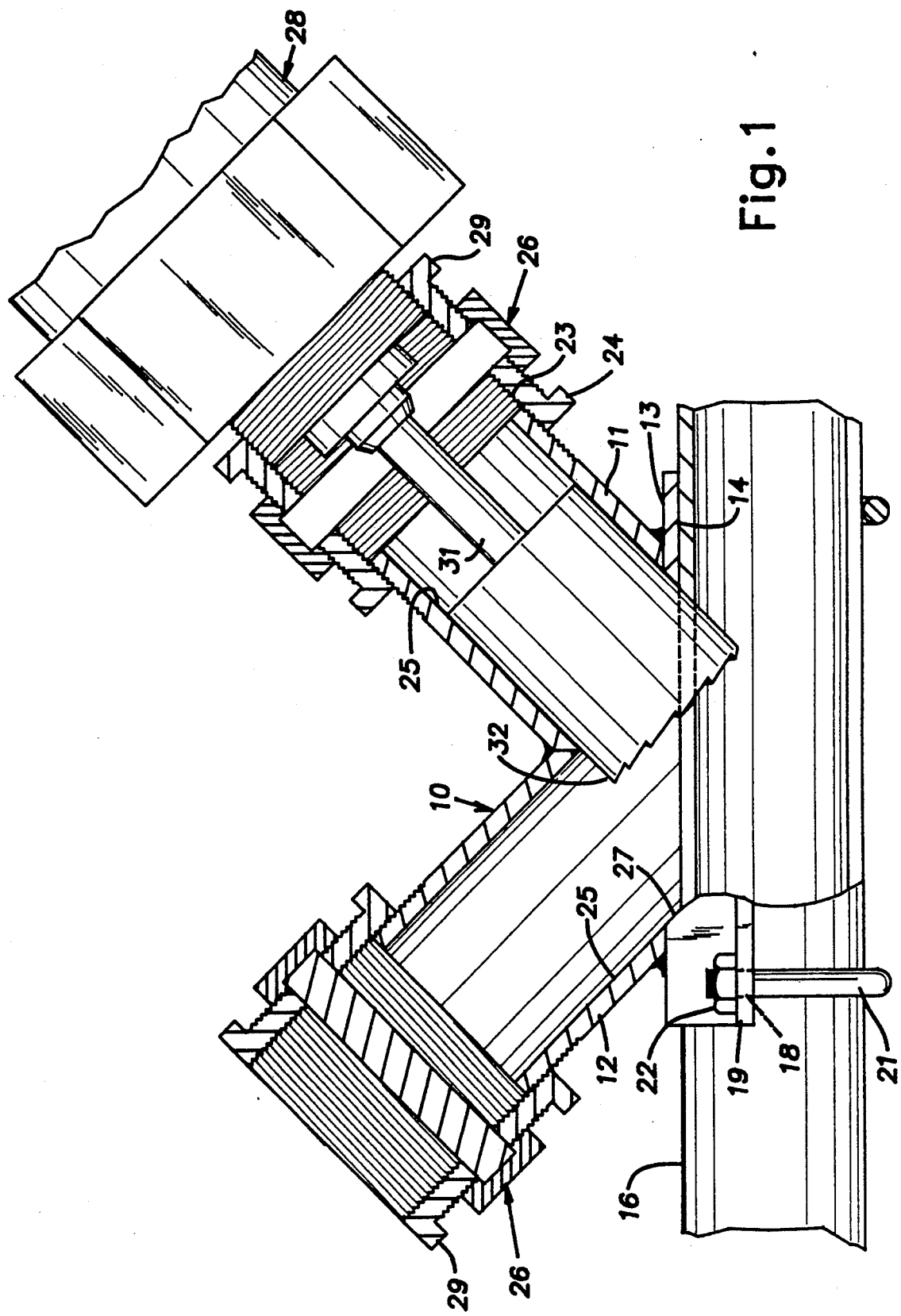
FIG. 1 is an elevational mostly cross-sectional view of an apparatus constructed in accordance with the invention and installed on a pipeline in service.

A housing 10 is installed at a selected strategic location of a pipeline 16. The illustrated pipeline 16 represents an underground natural gas line of, for example, 3 to 6 inches in size. The invention is useful with other types of pipelines and in other environments. At the site of the installation of the housing 10, the earth is excavated and the exterior surface of the pipe 16 is cleaned sufficiently to ensure that a fluidtight seal can be obtained between the pipe surfaces and the mating surfaces of the housing 10. The housing 10 includes a pair of branched nipples 11 and 12 welded or otherwise joined in fluidtight relation to a semi-cylindrical saddle plate 13. The housing is fabricated from steel parts or other suitable structural materials. The saddle plate 13 has a semi-cylindrical hollow configuration enabling its inside surface designated 14 to conform to the exterior surface of the pipeline 16. Holes 18 in flanges 19 are provided on each end and each side of the plate 13 to receive ends of U-bolts 21 which are tightened with associated nuts 22 to draw and hold the saddle plate 13 tightly against the pipeline 16. Gasket material (not shown) can be interposed between the saddle plate surface 14 and exterior of the pipeline 16 to achieve a fluidtight seal between these surfaces.

The nipples 11 and 12 are angled towards each other such that their axii lie in a common plane that passes through the coincident axii of the cylindrical saddle plate 13 and the pipeline 16. The axial direction of each branch nipple 11, 12 has a component along the axii of the saddle plate 13 and pipe 16 opposite to that of the other nipple so that with respect to the pipe, each branch nipple points in a direction opposite that of the other.

The branch nipples 11, 12 and saddle plate 13 comprise the principle parts of the housing 10 so that the enclosed space of the housing 10 is substantially that enclosed by each nipple 11, 12. On the distal or free end of each nipple 23 is a gate valve 26 of known construction that is operable selectively to close or open full access to the associated nipple. A threaded bushing 24 can be provided on the threaded distal ends 23 of the nipples 11, 12 to allow use of a single pair of gate valves 26 and related hardware on apparatus like the illustrated apparatus but of larger size for large pipe sizes.

The saddle plate 13 has an oblong hole 27 within space enclosed by the nipples 11, 12. The perimeter of this hole 27 corresponds to the combined projections of the cylindrical internal surfaces of the branched nipples 11, 12 on the saddle plate 13. A hot tapping machine 28 of generally known construction is mounted on one of the gate valves 26, for example, by threaded engagement with a bushing 29 threaded onto the gate valve 26. The machine 28 is selectively operable to rotate and axially displace a shaft 31 that is coaxial with the axis of the associated nipple 11 or 12. A rotary hole saw 32 is fixed to a free end of the shaft 31. The axial stroke of the shaft 31 is sufficient to completely extend and retract the hole saw through the associated nipple 11 or 12 and the associated gate valve 26. In the illustrated embodiment, the hole saw 32 has a diameter close to that of an inside surface 25 of the nipples 11 and 12 so that the latter surface can laterally support and guide the hole saw against significant movement radial of the axis of rotation.

When installed, the tapping machine 28 seals off the distal end of the nipple when the gate valve 26 is open. The tapping machine operates to extend the hole saw 32, mounted on the actuating shaft 31, through the gate valve and saddle plate hole 27 against the wall of the pipe 16. The hole saw or cutter 32, upon rotation, cuts into the wall of the pipe 16 along a line that corresponds to a projection of the cylindrical outline of the hole saw on the pipe. The cutter 32 is advanced until it cuts a slot at least to an imaginary plane transverse to the saddle plate axis and bisecting the joint between the branched nipples 11 and 12. At this time, the hole saw 32 is withdrawn through the associated gate valve 26 and the gate valve is closed. The hot tapping machine 28 is removed and mounted on the other nipple 11 or 12. With the associated gate valve 26 open the hole saw cutter 32 is again extended and rotated to form a second cut into the wall of the pipe 16. The cutter 32 is advanced until the slot it cuts meets the first cut slot at the mid-plane between the branched nipples 11 and 12. A magnet or other means for retaining the coupon cut from the pipe wall can be carried on the cutter or can be inserted through the first branch nipple prior to full separation of the coupon. In accordance with an important aspect of the invention, the branched nipples 11, 12 are oriented in a manner that causes the cutter 32 to be guided along their respective axii so that the resultant hole which it cuts is an oblong hole in the pipe sidewall which has its major dimension, measured along the axial or lengthwise direction of the pipe, substantially longer than a hole which could be cut with a single cutter 32 operating in only one branch at the same angle as either of the illustrated branches 11 and 12.

Figure 2:
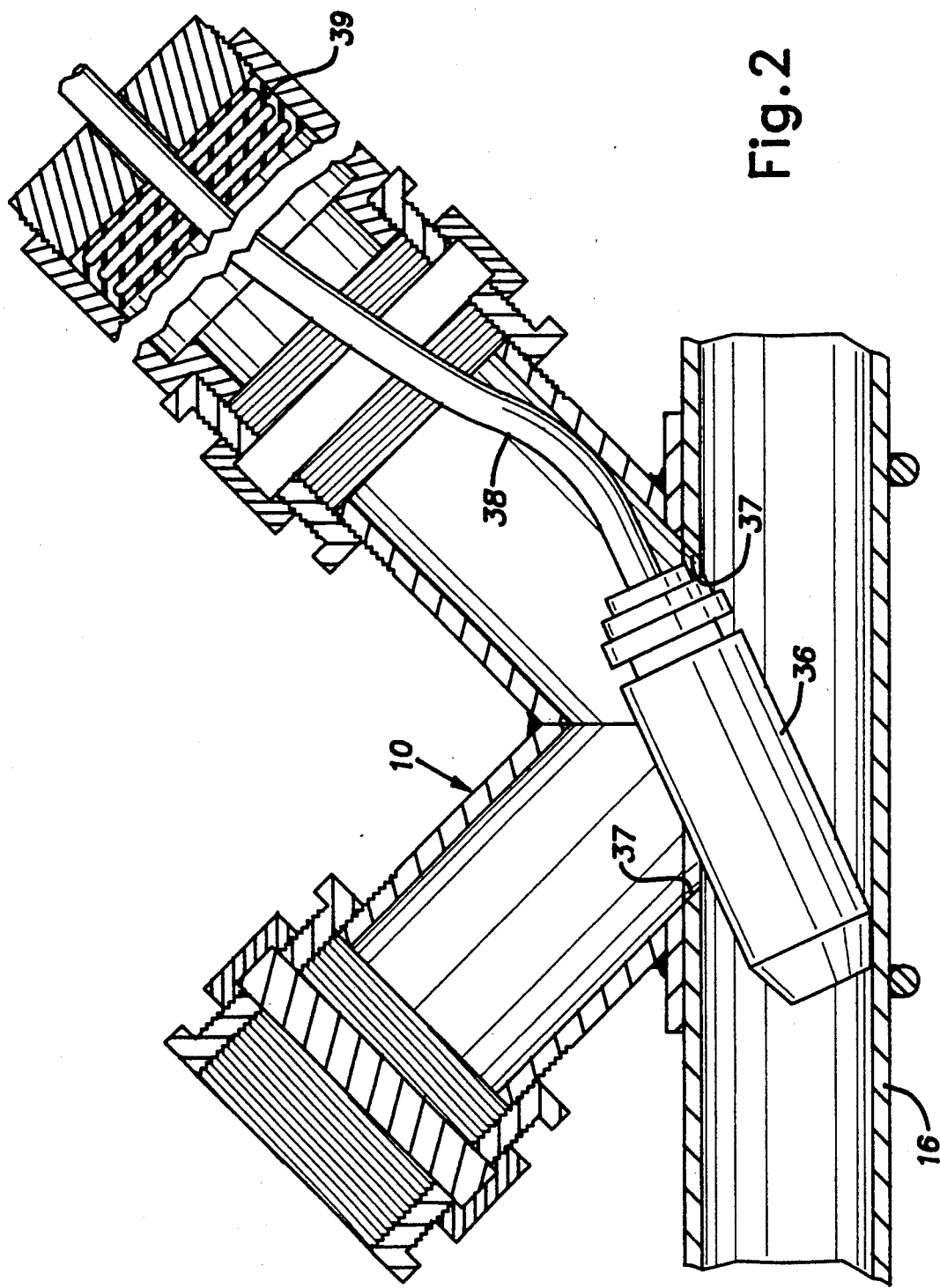
FIG. 2 is a view similar to FIG. 1 illustrating the insertion of an inspection camera device.
Figure 3:
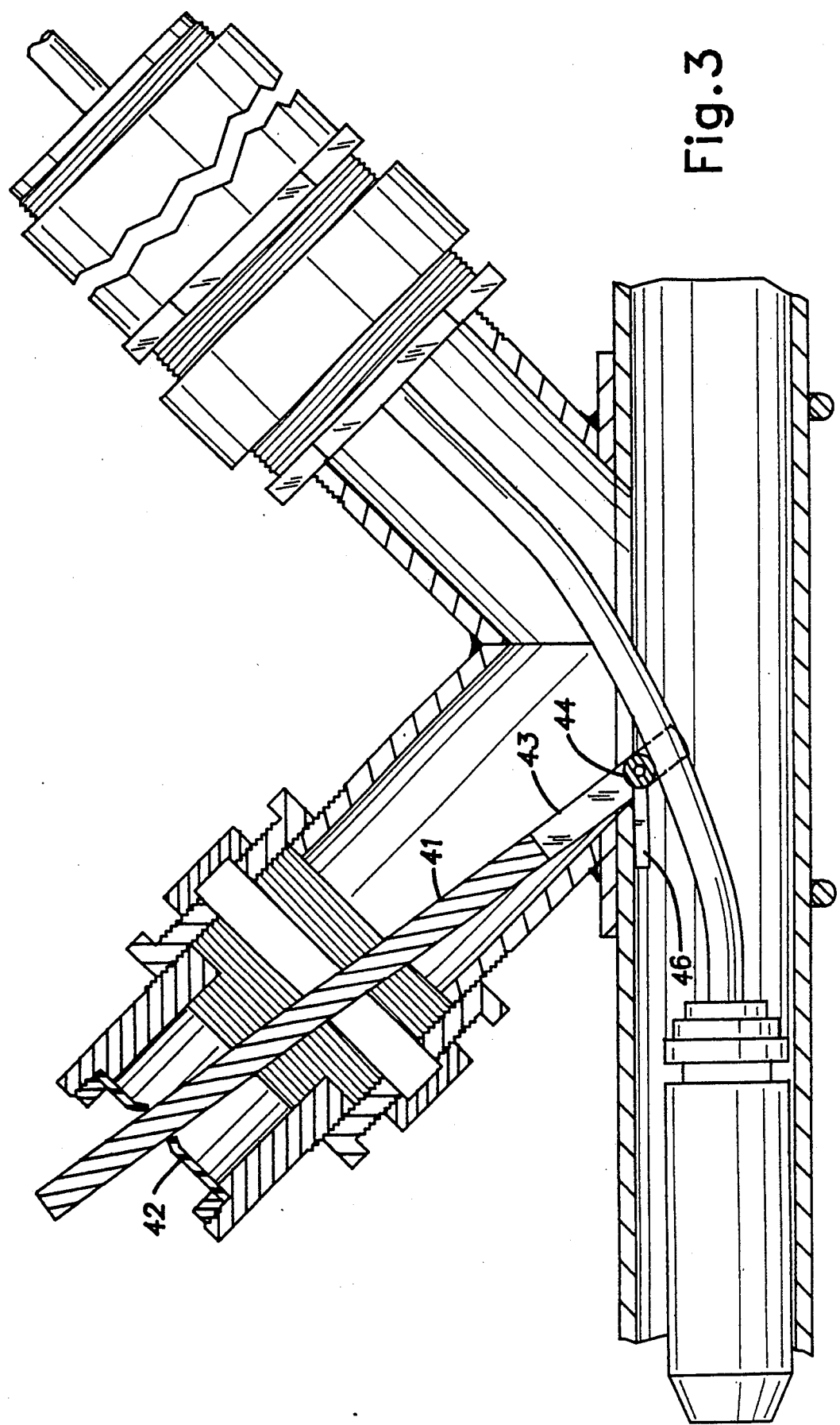
FIG. 3 is a view similar to FIGS. 1 and 2 illustrating the inspection camera fully received in the pipeline and a cable protection device in place.

With the coupon cut from the pipeline 16, the cutter 32 and hot tapping machine 28 can be removed from the branched nipples 11 and 12, A cylindrical TV inspection camera 36 is inserted into the pipeline through the freshly cut hole designated 37. As shown in FIGS. 2 and 3, the length of the elongated hole 37 enables the camera 36 to be manipulated into the pipeline 16 despite its relative bulk being of a diameter in the order of about one-half the inside diameter of the pipe and being of a length greater than the diameter of the pipe.

The camera 36 is guided by the nipple 11 or 12 into the pipeline 16. The angled orientation of a branched nipple 11 or 12 allows its internal surface to guide camera 16 and an associated cable 38 smoothly into the pipeline 16 and along the direction the particular branch nipple is pointed. FIG. 3 shows the condition where the camera 36 is fully received through the hole 37 into the pipeline 16. The angular or oblique orientation of a branched nipple 11 and 12 reduces the flexure in the cable 38 necessary to enter the pipeline. The camera 36 is pushed through the pipeline 16 by the cable 38 which is relatively stiff. As the camera moves, it makes a visual inspection of the interior of the pipeline to detect any signs of leakage, corrosion, other damage. A series of seals of packing 39 (FIG. 2) prevents significant leakage of fluid from the housing 10 along the cable 38 where it enters a branched nipple 11 or 12.

A guide bar implement 41 shown in FIG. 3 is used to protect the cable 38 from rubbing against an edge of the hole 37 remote from the nipple 11 or 12 through which the cable enters the pipe. The guide bar 41 is operated through the opposite nipple 11 or 12 from which the cable enters the pipe. An apertured diaphragm or other seal can be provided on the handle of the guide bar to prevent escape of fluid. A lower end 43 of the bar 41 is forked; journalled between the tines of the fork 43 is a cylindrical roller 44. Near the roller 44 is a projecting hook 46, fixed to the forked end 43, which is manipulated in to the hole 37 and caught against the interior surface of the pipe 16 to positively locate the fork and roller in proper position. In this position, the cable 38 passes under the roller 44 between the tines and is held away by the roller from the cut edge of the hole 37 remote from the nipple 11 or 12 through which cable 38 is being fed.

The cable 38 is driven, preferably by a powerwinch, progressively into the nipple 11 or 12. The angled orientation of the nipple relative to the axis of the pipe smoothly guides the cable without excessive bending. The camera is propelled axially along the pipe by a push force exerted through the cable 38. The distance that the camera inspection device 36 can be driven is limited by friction forces between the cable 38 and internal pipe surfaces and/or the working length of the communication wires transmitting data from the camera that are integrated with the cable proper. When the camera has reached the limit of its axial excursion in one direction, having visually recorded the condition of the pipe, it is withdrawn with the cable from the pipeline. With the gate valves 26 closed, the cable and packing 39 is transferred to the other nipple 11 or 12. The camera is then reintroduced into the pipeline and driven axially along the pipe in a direction opposite that of a first phase of inspection.

In this manner, a relatively long length of pipe can be inspected by cutting inspection holes 37 into the wall of the pipe 16 with the apparatus at distances spaced apart twice that of the working length of the cable. This is of particular advantages where the pipe being inspected is a natural gas line buried in the earth since a minimum number of excavation sites need be established. The angled character of each of the nipple branches 11 and 12 not only permits an oblong hole 37 to be readily cut in the wall of the pipe for reception of the elongate camera, but also permits passage of the cable 38 in both axial direction of pipe without severe bending of the cable on a relatively small Radius.

After inspection operations have been completed, the housing 10 can be loosened and slipped axially on a pipe while a permanent split sleeve of known construction is caused to follow it over the hole 34. The permanent sleeve is tightened on the pipeline for a permanent installation and the housing 10 is removed.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A method of inspecting a live pipeline comprising the steps of attaching a fluidtight housing on the pipeline, using a rotary cutter operating in the housing to cut a hole in the side of the pipeline, the cutter being supported in the housing to cut an elongated hole, with the major axis of the hole substantially aligned with the axial direction of the pipeline, inserting an elongated inspection device through the elongated hole, axially advancing the inspection device along the pipe by pushing it with a cable fed into the pipeline through the housing, the elongated hole being formed by successive operations of a circular hole saw rotating about two axes each oblique to the axis of the pipe and converging towards one another.

2. A method as set forth in claim 1, wherein the cable enters the housing along a line generally coincident with the axis of rotation of the cutter.

3. A method as set forth in claim 1, wherein the axes of rotation are arranged to produce a hole greater in length in the axial direction of the pipe than a hole which could be produced by the same cutter operating along only one of said axii.

4. A method as set forth in claim 3, wherein the housing is provided in the form of two converging branches corresponding to said axes of rotation, and the inspection device is introduced into the pipeline successively through a first and then a second of said branches, the pipe being inspected in one axial direction when the inspection device is inserted in the first branch and being inspected in the opposite direction when the inspection device is inserted in the second branch.

5. Apparatus for inspecting a pipeline in service comprising a housing adapted to be fixed on the exterior of the pipeline to isolate a portion of its wall from the environment, means for rotary cutting receivable in the housing, means on the housing for supporting said rotary cutting means for rotation and advance into the isolated wall portion on two separate cutting axii, each of said axii and the longitudinal axis of the pipe lying in substantially the same plane, the separate cutting axii each forming an oblique angle with the axis of the pipe and being arranged such that movement along each towards the pipeline includes a directional component opposite that of the other, means associated with each axis of the housing for valving the housing from the atmosphere, said rotary cutting supporting means including means for actuating carried by said housing outwardly of said valving means, the actuating means having a shaft for rotating and axially advancing said rotary cutting means successively along each of said cutting axii, said cutting axii and rotary cutting means being arranged to cut a hole in the side of the pipeline that is elongated in the axial direction of the pipeline and is greater in length in such direction that a hole which could be cut by said cutting means operating along only one of said axii whereby a relatively bulky elongated camera can be fully received in said pipeline through the elongated hole.

6. Apparatus as set forth in claim 5, including cable guide means insertable through said housing into proximity of the elongated hole to protect a cable trailing said inspection camera from an edge of the elongated hole.

* * * * *